(12) United States Patent
He (10) Patent No.: US 12,404,918 B2
(45) Date of Patent: Sep. 2, 2025

(54) AUTOMOBILE SUNROOF ADJUSTMENT MECHANISM

(71) Applicant: Yanfeng International Automotive Technology Co., Ltd., Shanghai (CN)

(72) Inventor: Yanyan He, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 0 days.

(21) Appl. No.: 18/691,545

(22) PCT Filed: Sep. 5, 2022

(86) PCT No.: PCT/CN2022/117075
§ 371 (c)(1),
(2) Date: Mar. 13, 2024

(87) PCT Pub. No.: WO2023/040691
PCT Pub. Date: Mar. 23, 2023

(65) Prior Publication Data
US 2024/0376966 A1    Nov. 14, 2024

(30) Foreign Application Priority Data
Sep. 14, 2021  (CN) .......................... 202111075367.6

(51) Int. Cl.
*F16H 19/08*   (2006.01)
*B60J 7/00*    (2006.01)
(Continued)

(52) U.S. Cl.
CPC .......... *F16H 19/08* (2013.01); *F16H 57/021* (2013.01); *F16H 57/028* (2013.01);
(Continued)

(58) Field of Classification Search
CPC .......... F16H 57/039; F16H 2057/0213; F16H 57/021; F16H 2057/02034; H02K 7/1166; H02K 7/116
See application file for complete search history.

(56) References Cited

U.S. PATENT DOCUMENTS 3,851,538 A * 12/1974 Denkowski ............... F16H 1/16
74/425
4,790,202 A * 12/1988 Hayashi .................... F16H 1/16
384/42
(Continued)

FOREIGN PATENT DOCUMENTS

CN        201437342        4/2010
CN        201956799        8/2011
(Continued)

OTHER PUBLICATIONS

International Search Report and Written Opinion for Application No. PCT/CN2022/117075 dated Oct. 26, 2022 (22 pages).

*Primary Examiner* — Jake Cook
(74) *Attorney, Agent, or Firm* — Boyle Fredrickson, S.C.

(57) ABSTRACT

An automobile sunroof adjustment mechanism comprises a motor, a gearbox body assembly and an output shaft. The gearbox body assembly comprises a box body and a transmission mechanism mounted in the box body. A motor shaft of the motor is connected to the transmission mechanism so as to drive the transmission mechanism. The transmission mechanism comprises a worm shaft, an input helical gear, a worm and an output helical gear. The worm and the output helical gear are located on different sides of the worm shaft. The present mechanism adopts a two-stage worm helical gear transmission, the two stages of worm not being self-locked, greatly reducing layout space, and the motor shaft and the output shaft are arranged in parallel, so that the
(Continued)

mechanism can be suitable for a limited-space scenario, and has better NVH performance.

20 Claims, 7 Drawing Sheets

(51) Int. Cl.
    *F16H 57/02*     (2012.01)
    *F16H 57/021*     (2012.01)
    *F16H 57/028*     (2012.01)
    *F16H 57/031*     (2012.01)

(52) U.S. Cl.
    CPC ........... F16H 57/031 (2013.01); *B60J 7/0007* (2013.01); *F16H 2057/02034* (2013.01); *F16H 2057/02082* (2013.01)

(56) References Cited

U.S. PATENT DOCUMENTS

| | | | |
|---|---|---|---|
| 9,243,700 B1 | 1/2016 | Deboth | |
| 11,202,513 B2 * | 12/2021 | Müller | F16H 1/225 |
| 12,040,681 B2 * | 7/2024 | Tomizawa | H02K 5/225 |

FOREIGN PATENT DOCUMENTS

| | | |
|---|---|---|
| CN | 202935260 | 5/2013 |
| CN | 205407492 | 7/2016 |
| CN | 206272424 | 6/2017 |
| CN | 108591445 | 9/2018 |
| CN | 209982264 | 1/2020 |
| CN | 201949838 | 7/2020 |
| CN | 113847392 | 12/2021 |
| JP | 2019038460 | 3/2019 |

* cited by examiner

AUTOMOBILE SUNROOF ADJUSTMENT MECHANISM

CROSS REFERENCE TO RELATED APPLICATIONS

This application is a national application of international PCT/CN2022/117075, filed on Sep. 5, 2022, which claims priority to Chinese patent application 202111075367.6, filed on Sep. 14, 2021, the contents of each of which are hereby incorporated by reference.

BACKGROUND OF THE INVENTION

1. Field of the Invention

The present invention relates to an automobile sunroof system and more specifically to an automobile sunroof adjustment mechanism, also known as a pop-up window adjustment mechanism.

2. Related Art

The sunroof adjustment mechanism equipped on the automobile is known to open and close the sunshade by driving the winding motion of the sunroof sunshade. In the driving mechanism of the existing automobile sunroof sunshade, the motor axis and gearbox body output axis are intersected (such as vertical) in space. The whole structure is comparatively complex, and it is difficult to assemble. In addition, the layout space is relatively large. In a limited-space scenario, when the motor shaft is horizontally arranged, the output shaft cannot be rotated in the horizontal direction.

SUMMARY OF THE INVENTION

In order to solve the problem of relatively large layout space in the above-mentioned prior art, the invention provides an automobile sunroof adjustment mechanism.

The automobile sunroof adjustment mechanism according to the present invention comprises a motor, a gearbox body assembly and an output shaft, wherein the gearbox body assembly comprises a box body and a transmission mechanism mounted in the box body, wherein a motor shaft of the motor is connected to the transmission mechanism so as to drive the transmission mechanism, wherein the transmission mechanism is connected to the output shaft so as to drive the output shaft, the axis of the motor shaft being parallel to the axis of the output shaft, wherein the transmission mechanism comprises a worm shaft, an input helical gear, a worm and an output helical gear, wherein the worm is fixedly connected to the motor shaft, wherein the worm shaft is rotatably mounted in the box body, the input helical gear is fixedly connected to the worm shaft, wherein the output helical gear is fixedly connected to the output shaft, wherein the worm is meshed with the input helical gear, so as to form a first-stage worm helical gear transmission, wherein the output helical gear is meshed with the worm shaft to form a second-stage worm helical gear transmission, and wherein the worm and the output helical gear are located on different sides of the worm shaft.

Preferably, the transmission mechanism further comprises supporting blocks, and the worm shaft is restrained by the supporting blocks and rotatably mounted in the box body.

Preferably, the worm shaft is an integral worm shaft and provided with a worm portion meshed with the output helical gear.

Preferably, the output helical gear is integrally formed with the output shaft.

Preferably, the output helical gear is provided with a geometric hole or a splined hole, and the output shaft is inserted into the geometric hole or the spline hole to provide an anti-rotation installation.

Preferably, the box body is provided with a first hole portion and a second hole portion that are coaxially arranged, into which two ends of the output helical gear are inserted respectively to provide a support and an axial positioning.

Preferably, the first hole portion and the second hole portion are through holes or blind holes, and the output shaft extends out from the through hole(s).

Preferably, the box body comprises a housing and a cover, which are fixedly connected by bolts and/or buckles.

Preferably, a shell of the motor is mounted outside of the box body, and the shell is fixedly mounted on the box body by bolts.

Preferably, the shell is provided with at least one blind hole, the box body is provided with at least one convex pin, and the convex pin is inserted into the blind hole.

Preferably, the motor and the gearbox body assembly are connected in an L-shape.

Preferably, the transmission mechanism further comprises a bearing, and an end of the motor shaft is supported on the cover by the bearing.

Preferably, the cover is provided with a convex hole, and the bearing is arranged in the convex hole and disposed around the end of the motor shaft to support the motor shaft.

Preferably, the transmission mechanism further comprises an elastomer, and the elastomer is arranged in the convex hole and between the bearing and the cover.

Preferably, the motor shaft is a cantilever structure without support.

The automobile sunroof adjustment mechanism according to the present invention adopts a two-stage worm helical gear transmission, the two stages of worm not being self-locked. The first-stage worm helical gear transmission and the second-stage worm helical gear transmission are located on different sides of the middle worm shaft, greatly reducing layout space, and the motor shaft and the output shaft are arranged in parallel, so that the mechanism can be suitable for a limited-space scenario, and has a better NVH (noise, vibration, and sound harshness) performance. In a word, the automobile sunroof adjustment mechanism according to the present invention is compact, and the vibration and noise performance is good. Moreover, in the automobile sunroof adjustment mechanism according to the present invention, the output helical gears with several designs can be adapted to a variety of occasions.

DESCRIPTION OF THE ENABLING EMBODIMENT

In conjunction with the accompanying drawings, preferred embodiments of the present invention are given and described in detail below.

Figure 1:
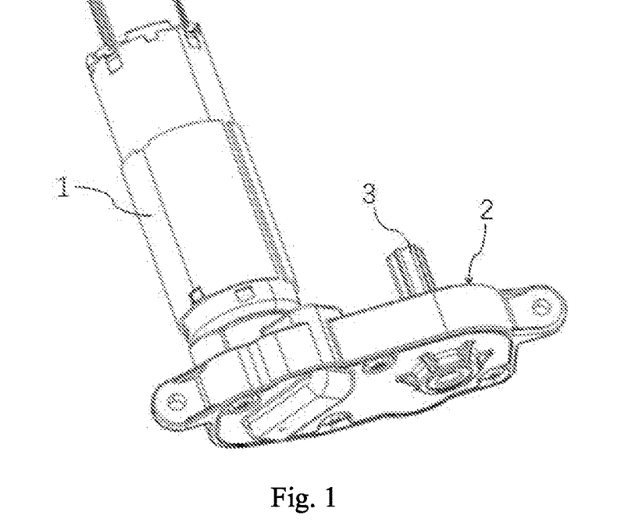
FIG. 1 is a structural schematic view of the automobile sunroof adjustment mechanism according to one preferred embodiment of the present invention.

As shown in FIG. 1, the automobile sunroof adjustment mechanism according to a preferred embodiment of the present invention comprises a motor 1, a gearbox body assembly 2 and an output shaft 3. The motor 1 and the gearbox body assembly 2 are connected in a rough L-shape. The structure is compact, the layout space is small. The output shaft 3 is connected to the motor 1 by the gearbox body assembly 2, so that the sunshade (not shown) connected to the output shaft 3 is driven by the motor 1.

Figure 2:
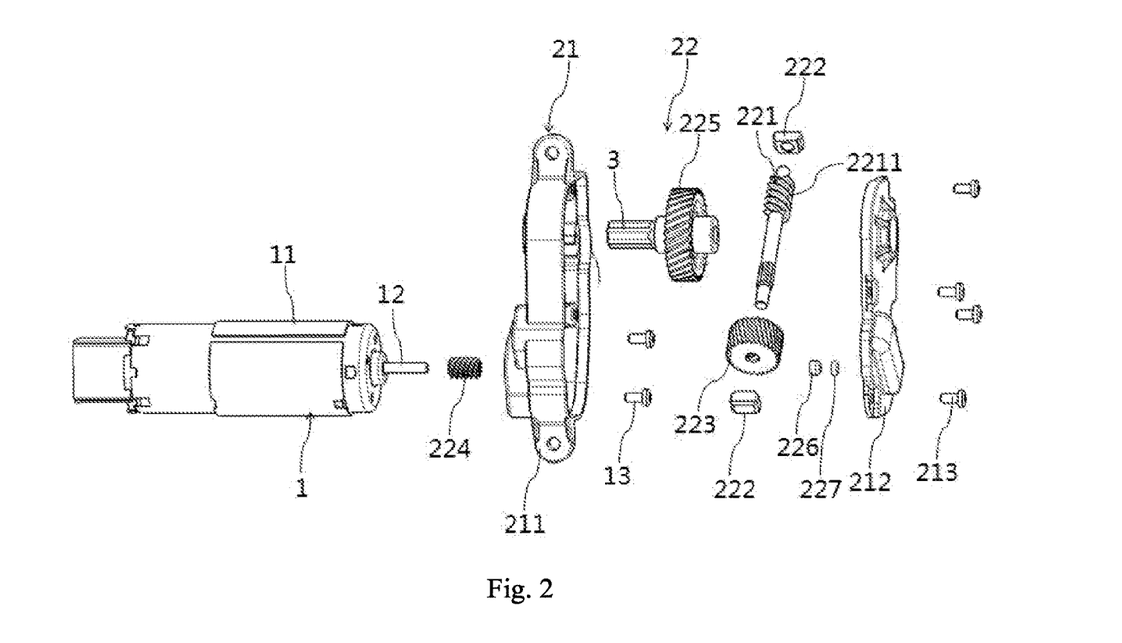
FIG. 2 is an exploded view of FIG. 1.

As shown in FIG. 2, this gearbox body assembly 2 comprises a box body 21 and a transmission mechanism 22. In conjunction with FIG. 1, a shell 11 of the motor 1 is mounted outside of the box body 21, and a motor shaft 12 of the motor 1 extends into the box body 21 and is connected to the transmission mechanism 22 therein. The transmission mechanism 22 is a two-stage worm helical gear transmission and is connected to the output shaft 3. Therefore, a larger transmission ratio and a better NVH performance are provided, and the axis of the output shaft 3 is guaranteed to be parallel to the axis of the motor shaft 12 simultaneously.

Figure 3:
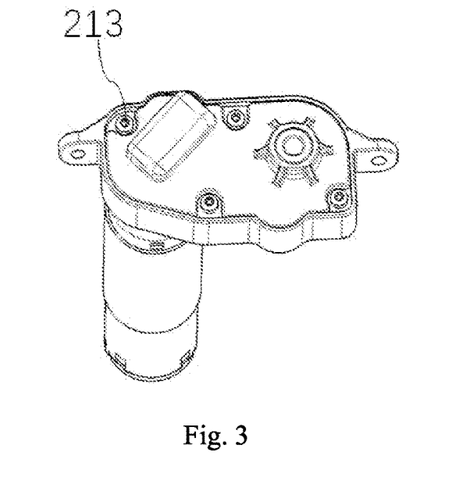
FIG. 3 is another structural schematic view of the automobile sunroof adjustment mechanism of FIG. 1.
Figure 4:
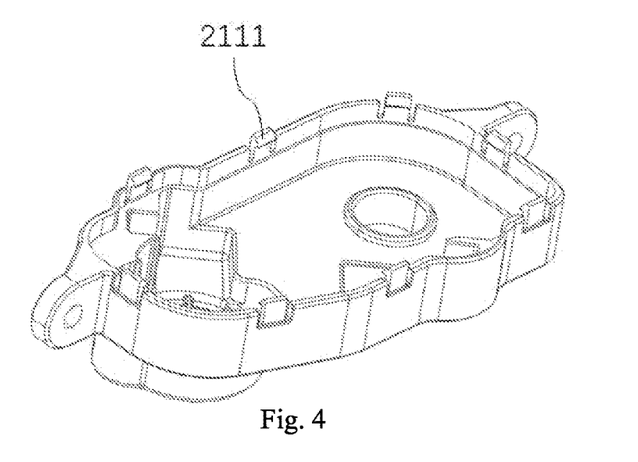
FIG. 4 is a structural schematic view of the housing of the gearbox body assembly of the automobile sunroof adjustment mechanism according to another preferred embodiment of the present invention.
Figure 5:
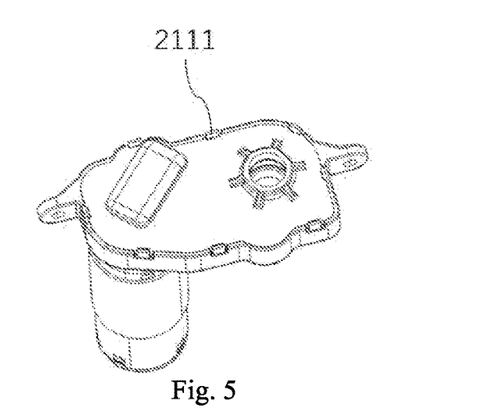
FIG. 5 is a structural schematic view of automobile sunroof adjustment mechanism comprising the housing of FIG. 4.

As shown in FIG. 2, the box body 21 comprises a housing 211 and a cover 212. As shown in FIG. 3, the housing 211 and the cover 212 are fixedly connected by first bolts 213. It should be understood that the housing 211 and the cover 212 can also be connected and fixed by other means. As shown in FIG. 4, a plurality of buckles 2111 are provided on the periphery of the housing, which are inserted and clamped into the corresponding holes of the cover. As shown in FIG. 5, a protrusion is provided on the upper part of the buckle 2111. When the housing is buckled with the cover, the protrusions are stuck above the cover. Thus, the cover is prevented from falling out.

Figure 6:
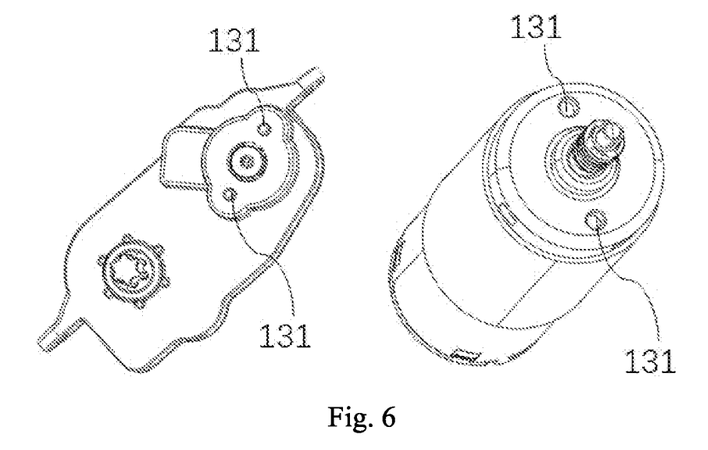
FIG. 6 is another structural schematic view of the shell of the motor and the housing of the gearbox body assembly of FIG. 2.
Figure 7:
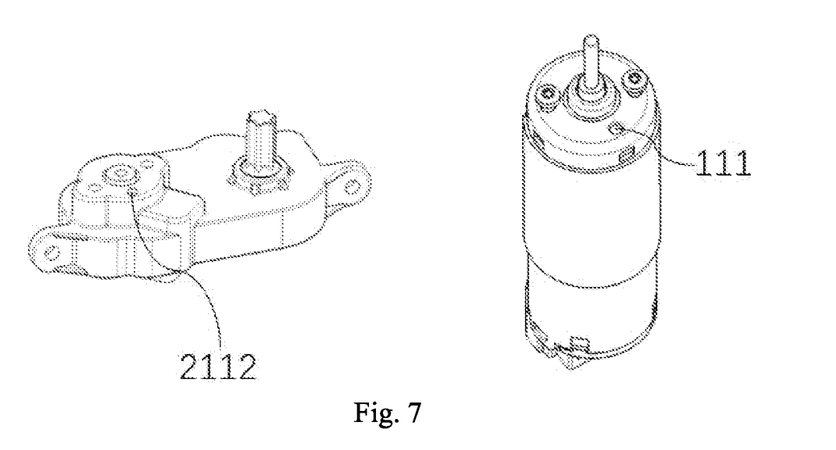
FIG. 7 is a structural schematic view of the shell of the motor and the housing of the gearbox body assembly of the automobile sunroof adjustment mechanism according to another preferred embodiment of the present invention.
Figure 8:
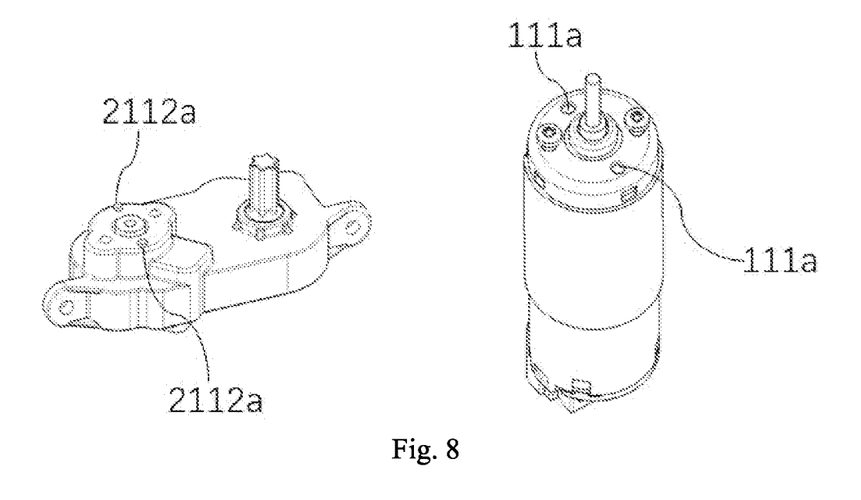
FIG. 8 is a structural schematic view of the shell of the motor and the housing of the gearbox body assembly of the automobile sunroof adjustment mechanism according to yet another preferred embodiment of the present invention.

Back to FIG. 2, the shell 11 of the motor 1 is fixedly mounted on the housing 211 of the box body 21 of the gearbox body assembly 2 by second bolts 13. Referring to FIG. 6, the shell 11 of the motor 1 and the housing 211 of the gearbox body assembly 2 are respectively provided with through holes 131, into which the second bolts 13 are inserted to fix the motor 1 to the gearbox body assembly 2. In another embodiment, in addition to the through holes, the shell of the motor is provided with a blind hole 111, and the housing of the gearbox body assembly is provided with a convex pin 2112, as shown in FIG. 7. The convex pin 2112 is inserted into the blind hole 111 to provide a prepositioning of the motor on the gearbox body assembly. In yet another embodiment, the shell of the motor is provided with two blind holes 111a, and the housing of the gearbox body assembly is provided with two convex pins 2112a, as shown in FIG. 8. The convex pins 2112a are inserted into the blind holes 111a to provide an accurate positioning of the motor on the gearbox body assembly.

Figure 9:
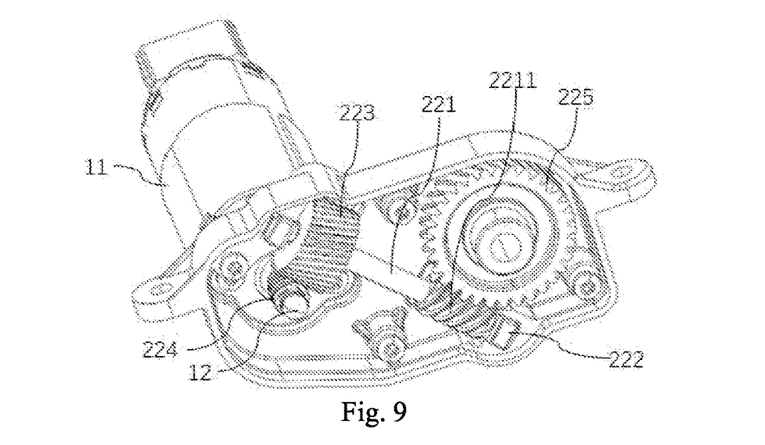
FIG. 9 is yet another structural schematic view of the automobile sunroof adjustment mechanism of FIG. 1, wherein the cover is omitted for a clear purpose.

Returning to FIG. 2, the transmission mechanism 22 comprises a worm shaft 221 and two supporting blocks 222. As shown in FIG. 9, two ends of the worm shaft 221 are restrained by the supporting blocks 222 and rotatably mounted in the box body 21. In the present embodiment, the worm shaft 221 is an integral worm shaft and provided with a worm portion 2211. In the present embodiment, the worm shaft 221 is obliquely mounted in the box body 21, namely is mounted substantially along a diagonal of the box body 21.

Returning to FIG. 2, the transmission mechanism 22 further comprises an input helical gear 223 and a worm 224, forming a first-stage worm helical gear transmission. The input helical gear 223 is fixedly mounted at one end opposite to the worm portion 2211 of the worm shaft 221, as shown in FIG. 9. The worm 224 is fixedly mounted on the motor shaft 12 of the motor 1. By virtue of the helical gear 223 meshed with the worm 224, the rotation of the worm shaft 221 can be driven by the motor 1.

Returning to FIG. 2, the transmission mechanism 22 further comprises an output helical gear 225, forming a second-stage worm helical gear transmission. Two ends of the output helical gear 225 are inserted into the housing 211 and the cover 212 respectively to be rotatably mounted. As shown in FIG. 9, the output helical gear 225 is meshed with the worm portion 2211 of the worm shaft 221, and thus the rotation of the output helical gear 225 is driven by the worm shaft 221. In particular, as shown in FIG. 9, the worm 224 that forms the first-stage worm helical gear transmission and the output helical gear 225 that forms the second-stage worm helical gear transmission are located on different sides of the worm shaft 221. The two stages of worm are not self-locked. Thus, the transmission mechanism 22 is compact, and the layout space is greatly reduced.

Figure 10:
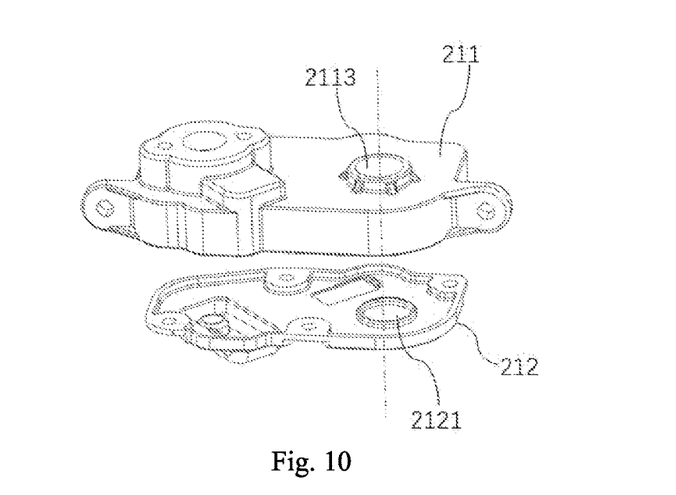
FIG. 10 is another structural schematic view of the housing and cover of the gearbox body assembly of FIG. 2.
Figure 11:
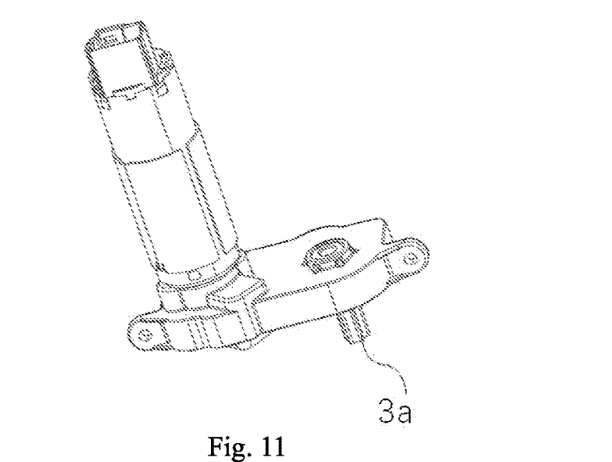
FIG. 11 is a structural schematic view of the automobile sunroof adjustment mechanism according to another preferred embodiment of the present invention.
Figure 12:
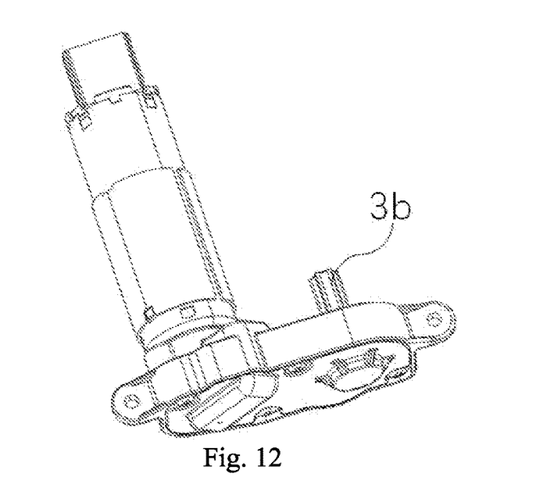
FIG. 12 is a structural schematic view of the automobile sunroof adjustment mechanism according to yet another preferred embodiment of the present invention.
Figure 13:
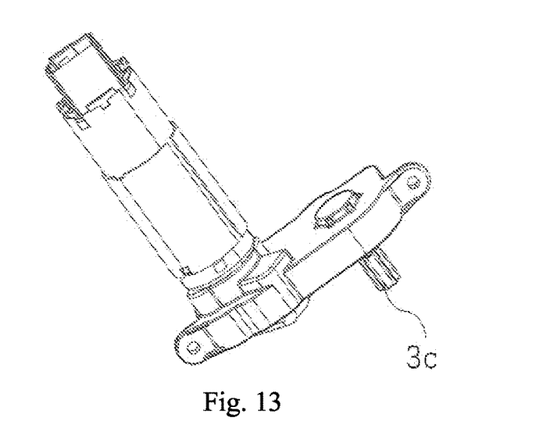
FIG. 13 is a structural schematic view of the automobile sunroof adjustment mechanism according to yet another preferred embodiment of the present invention.
Figure 14:
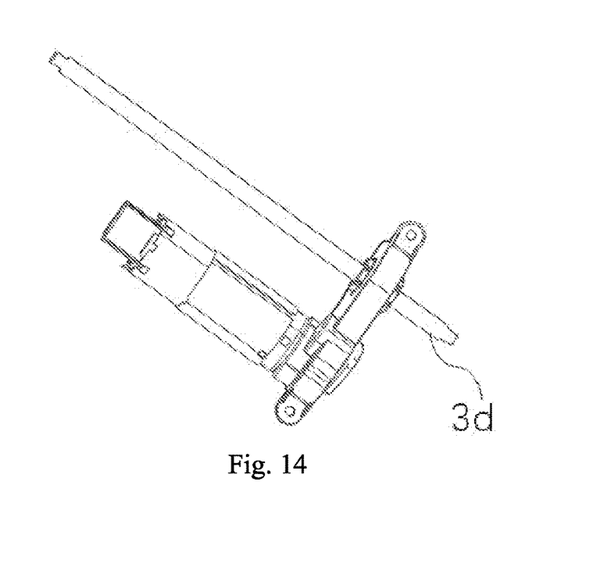
FIG. 14 is a structural schematic view of the automobile sunroof adjustment mechanism according to yet another preferred embodiment of the present invention.
Figure 15:
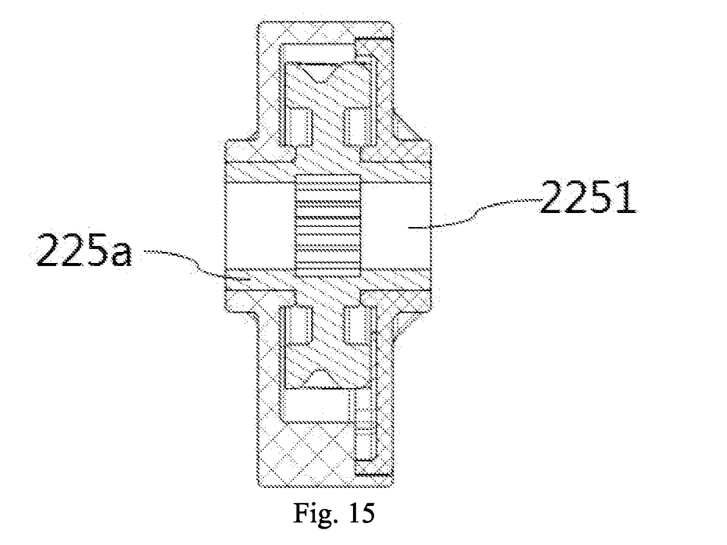
FIG. 15 is a cross-sectional view of the output helical gear of the automobile sunroof adjustment mechanism according to yet another preferred embodiment of the present invention.

As shown in FIG. 10, the housing 211 is provided with a first hole portion 2113, and the cover 212 is provided with a second hole portion 2121, both of them are coaxially arranged, two ends of the output helical gear 225 are inserted into them respectively in order to support the output helical gear 225. Thus, an axial positioning of the output helical gear 225 is provided. It should be understood that the first hole portion 2113 and the second hole portion 2121 can be selected as through holes or blind holes as needed. In the present embodiment, the first hole portion 2113 and the second hole portion 2121 are through holes, and the output shaft 3 that is integrally formed in the center of the output helical gear 225 extends out from the first hole portion 2113, as shown in FIG. 1. In another embodiment, the first hole portion and the second hole portion are both through holes, and the output shaft 3a extends from the second hole portion, as shown in FIG. 11. In yet another embodiment, the first hole portion is a through hole, the second hole portion is a blind hole, and the output shaft 3b extends out from the first hole portion, as shown in FIG. 12. In yet another embodiment, the first hole portion is a blind hole, the second hole portion is a through hole, and the output shaft 3c of the output helical gear extends out from the second hole portion, as shown in FIG. 13. In yet another embodiment, the first hole portion and the second hole portion are both through holes, and the output shaft 3d extends out from both the first hole portion and the second hole portion, as shown in FIG. 14. In above embodiments, the output shafts 3, 3a, 3b, 3c, 3d are shaft structures that are integrally formed with the output helical gear 225. It should be understood that the output shaft may also be an independent structure that is additionally connected to the output helical gear. As shown in FIG. 15, the output helical gear 225a is provided with a geometric hole (such as a square hole) or a splined hole 2251 in the center, and the output shaft is inserted into the hole in a form-fit. The output helical gears with above-mentioned designs can be adapted to a variety of occasions, to provide good accessibility and convenience.

Figure 16:
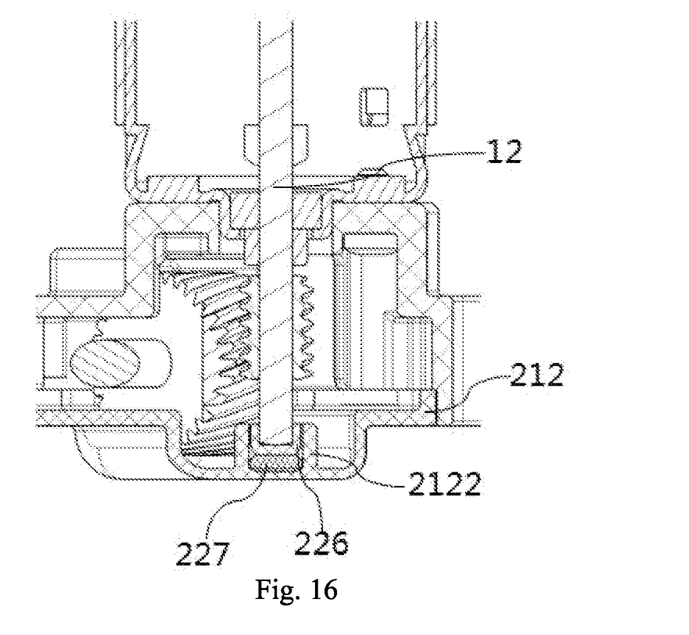
FIG. 16 is a cross-sectional view of the elastomer and mounting shell mounted on the motor shaft of FIG. 2.
Figure 17:
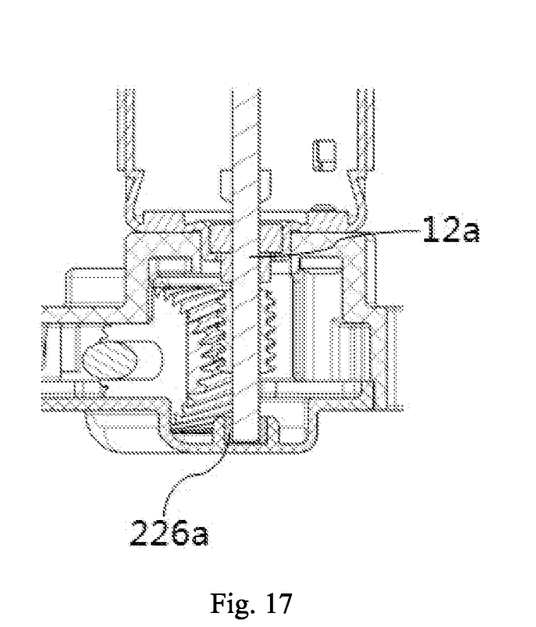
FIG. 17 is a cross-sectional view of the mounting bearing mounted on the motor shaft of the automobile sunroof adjustment mechanism according to another preferred embodiment of the present invention.
Figure 18:
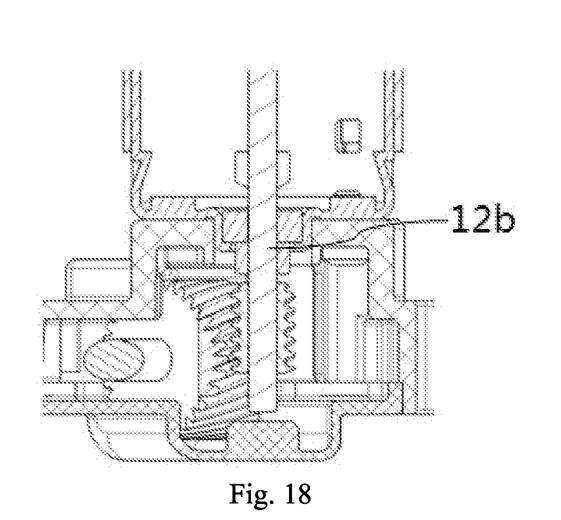
FIG. 18 is a cross-sectional view of the unsupported motor shaft of the automobile sunroof adjustment mechanism according to yet another preferred embodiment of the present invention.

Returning to FIG. 2, the transmission mechanism 22 further comprises a bearing 226 and an elastomer 227, and the end of the motor shaft 12 of the motor 1 is supported on the cover 212 through the bearing 226 and the elastomer 227. Specifically, as shown in FIG. 16, the cover 212 is provided with a convex hole 2122, in which the bearing 226 and the elastomer 227 are mounted. The bearing 226 is disposed around the end of the motor shaft 12 to support the motor shaft 12. The elastomer 227 is arranged between the bearing 226 and the cover 212 to eliminate the axial clearance of the motor shaft 12. In another embodiment, the elastomer is not included in the transmission mechanism, as shown in FIG. 17. The mounting bearing 226a in the convex hole of the cover is disposed around the end of the motor shaft 12a to provide the support, namely providing a radial bearing support. In yet another embodiment, neither the elastomer and mounting shell, nor the mounting bearing is included in the transmission mechanism. The motor shaft 12b is a cantilever structure without support, as shown in FIG. 18.

The foregoing description refers to preferred embodiments of the present invention and is not intended to limit the scope of the present invention. Various changes can be made to the foregoing embodiments of the present invention. All simple and equivalent changes and modifications in accordance with the claims of the present invention and the content of the description fall into the protection scope of the patent of the present invention. What is not described in detail in the present invention is conventional technical content.

What is claimed is:

1. An automobile sunroof adjustment mechanism, comprising
   a motor,
   a gearbox body assembly and
   an output shaft,
   wherein the gearbox body assembly comprises a box body and a transmission mechanism mounted in the box body,
   wherein a motor shaft of the motor is connected to the transmission mechanism so as to drive the transmission mechanism,
   wherein the transmission mechanism is connected to the output shaft so as to drive the output shaft, the axis of the motor shaft being parallel to the axis of the output shaft,
   wherein the transmission mechanism comprises a worm shaft, an input helical gear, a worm and an output helical gear,
   wherein the worm is fixedly connected to the motor shaft,
   wherein the worm shaft is rotatably and obliquely mounted in the box body, the input helical gear is fixedly connected to the worm shaft,
   wherein the output helical gear is fixedly connected to the output shaft,
   wherein the worm is meshed with the input helical gear, so as to form a first-stage worm helical gear transmission,
   wherein the output helical gear is meshed with the worm shaft to form a second-stage worm helical gear transmission,
   wherein the box body is provided with a first hole portion and a second hole portion that are coaxially arranged, into which two ends of the output helical gear are inserted respectively to provide a support and an axial positioning, and
   wherein the worm and the output helical gear are located on different sides of the worm shaft.

2. The automobile sunroof adjustment mechanism according to the claim 1, wherein the transmission mechanism further comprises supporting blocks, and the worm shaft is restrained by the supporting blocks and rotatably mounted in the box body.

3. The automobile sunroof adjustment mechanism according to the claim 1, wherein the worm shaft is an integral worm shaft and provided with a worm portion meshed with the output helical gear.

4. The automobile sunroof adjustment mechanism according to the claim 1, wherein the output helical gear is integrally formed with the output shaft.

5. The automobile sunroof adjustment mechanism according to the claim 1, wherein the output helical gear is provided with a geometric hole or a splined hole, and the output shaft is inserted into the geometric hole or the spline hole to provide an anti-rotation installation.

6. The automobile sunroof adjustment mechanism according to the claim 1, wherein a shell of the motor is mounted outside of the box body, and the shell is fixedly mounted on the box body by bolts.

7. The automobile sunroof adjustment mechanism according to the claim 6, wherein the shell is provided with at least one blind hole, the box body is provided with at least one convex pin, and the convex pin is inserted into the blind hole.

8. The automobile sunroof adjustment mechanism according to the claim 1, wherein the motor and the gearbox body assembly are connected in an L-shape.

9. The automobile sunroof adjustment mechanism according to the claim 1, wherein the box body comprises a cover, the transmission mechanism further comprises a bearing, and an end of the motor shaft is supported on the cover by the bearing.

10. The automobile sunroof adjustment mechanism according to the claim 9, wherein the cover is provided with a convex hole, and the bearing is arranged in the convex hole and disposed around the end of the motor shaft to support the motor shaft.

11. The automobile sunroof adjustment mechanism according to the claim 10, wherein the transmission mechanism further comprises an elastomer, and the elastomer is arranged in the convex hole and between the bearing and the cover.

12. The automobile sunroof adjustment mechanism according to the claim 1, wherein the motor shaft is a cantilever structure without support.

13. The automobile sunroof adjustment mechanism according to the claim 1, wherein the worm shaft is disposed substantially along a diagonal of the box body.

14. An automobile sunroof adjustment mechanism, comprising
a motor,
a gearbox body assembly having a box body,
an output shaft,
a transmission mechanism mounted in the box body,
a motor shaft to drive the transmission mechanism,
an axis of the motor shaft being parallel to an axis of the output shaft,
a worm fixedly connected to the motor shaft,
a worm shaft rotatably and obliquely mounted in the box body,
an input helical gear fixedly connected to the worm shaft,
an output helical gear fixedly connected to the output shaft and located on a side of the worm shaft opposite the worm,
a first-stage worm helical gear transmission formed when the worm is meshed with the input helical gear,
a second-stage worm helical gear transmission formed when the output helical gear is meshed with the worm shaft, and
a first hole portion and a second hole portion coaxially arranged within the box body and into which two ends of the output helical gear are inserted respectively to provide a support and an axial positioning.

15. The automobile sunroof adjustment mechanism of claim 14, further comprising supporting blocks, and the worm shaft is restrained by the supporting blocks and rotatably mounted in the box body.

16. The automobile sunroof adjustment mechanism of claim 14, further comprising a worm portion meshed with the output helical gear.

17. The automobile sunroof adjustment mechanism of claim 14, further comprising a geometric hole in the output helical gear to receive the output shaft and provide an anti-rotation installation.

18. An automobile sunroof adjustment mechanism, comprising
a motor,
a gearbox body assembly connected to the motor in an L-shape,
an output shaft having an axis,
a box body included in the gear box assembly,
a transmission mechanism mounted in the box body,
a motor shaft having a cantilever structure without support,
a motor shaft axis parallel to the axis of the output shaft and drivably connected to the transmission mechanism,
a worm shaft rotatably and obliquely mounted in the box body,
a worm connected to the motor shaft and located on a first side of the worm shaft,
an input helical gear connected to the worm shaft,
an output helical gear integrally formed with the output shaft,
a first-stage worm helical gear transmission formed when the worm is meshed with the input helical gear,
a second-stage worm helical gear transmission formed when the output helical gear is meshed with the worm shaft,
a first hole portion and a second hole portion coaxially arranged within the box body and into which two ends of the output helical gear are inserted respectively to provide a support and an axial positioning,
a first side of the worm shaft for the worm, and
a second side of the worm shaft for the output helical gear.

19. The automobile sunroof adjustment mechanism of claim 18, further comprising
a) a shell for the motor 1) mounted outside of the box body by bolts, 2) provided with at least one blind hole for receiving a convex pin,
b) a cover for the box body and having a convex hole,
c) a bearing arranged in the convex hole and disposed around an end of the motor shaft to support the motor shaft, and
d) an elastomer further comprising the transmission mechanism, the elastomer arranged in the convex hole and between the bearing and the cover.

20. The automobile sunroof adjustment mechanism of claim 1, wherein the first hole portion is a through hole and the second hole portion is a through hole, and the output shaft extends out from the through holes.

* * * * *